(12) United States Patent
Lange

(10) Patent No.: US 12,509,871 B2
(45) Date of Patent: Dec. 30, 2025

(54) CHECK VALVE WITH VENTILATION DEVICE

(71) Applicant: TROBOLO Deutschland GmbH, Hannover (DE)

(72) Inventor: Friedrich Lange, Niepruszewo (PL)

(73) Assignee: TROBOLO Europe Sp.zo.o, Poznan (PL)

(*) Notice: Subject to any disclaimer, the term of this patent is extended or adjusted under 35 U.S.C. 154(b) by 235 days.

(21) Appl. No.: 18/173,595

(22) Filed: Feb. 23, 2023

(65) Prior Publication Data
US 2023/0272609 A1    Aug. 31, 2023

(30) Foreign Application Priority Data

Feb. 25, 2022 (DE) ...................... 10 2022 201 998.9
Mar. 3, 2022 (DE) ...................... 10 2022 202 198.3

(51) Int. Cl.
| | | |
|---|---|---|
| *E03D 11/10* | (2006.01) | |
| *E03D 9/05* | (2006.01) | |
| *F16K 15/04* | (2006.01) | |
| *F16K 15/14* | (2006.01) | |

(52) U.S. Cl.
CPC ............... *E03D 11/10* (2013.01); *E03D 9/05* (2013.01); *F16K 15/04* (2013.01); *F16K 15/145* (2013.01)

(58) Field of Classification Search
CPC .................................. E03D 11/10; E03D 9/05
See application file for complete search history.

(56) References Cited

U.S. PATENT DOCUMENTS

| | | | |
|---|---|---|---|
| 9,027,172 B2* | 5/2015 | Fima ....................... | E03C 1/298 4/287 |
| 9,657,854 B2* | 5/2017 | Landon ................... | F16K 15/02 |
| 11,260,726 B2 | 3/2022 | Daly et al. | |
| 2017/0121953 A1* | 5/2017 | Benesh .................. | F16K 15/148 |
| 2017/0122445 A1* | 5/2017 | Fima ....................... | E03C 1/298 |

FOREIGN PATENT DOCUMENTS

EP          1531070 B1     12/2008

* cited by examiner

*Primary Examiner* — Christine J Skubinna
(74) *Attorney, Agent, or Firm* — Greer, Burns & Crain, Ltd.; Steven P. Fallon

(57) ABSTRACT

A check valve comprising, between an inlet end and an opposite outlet end along a common longitudinal axis, optionally an adapter arranged between the inlet end and a seal seat, a seal seat formed by a rigid scaffold, a closure element formed by an elastic closure part, optionally a stop ball, and optionally a stop that can be latched to the scaffold, wherein the scaffold and the closure part are shaped to match one another in the region of the seal seat, and the closure part is tensioned against the scaffold in the region of the seal seat in the rest position and is retained therein, wherein the scaffold has breaches in the region of the seal seat, and the closure element is formed in one piece with a venting device.

16 Claims, 7 Drawing Sheets

CHECK VALVE WITH VENTILATION DEVICE

Figure 1:
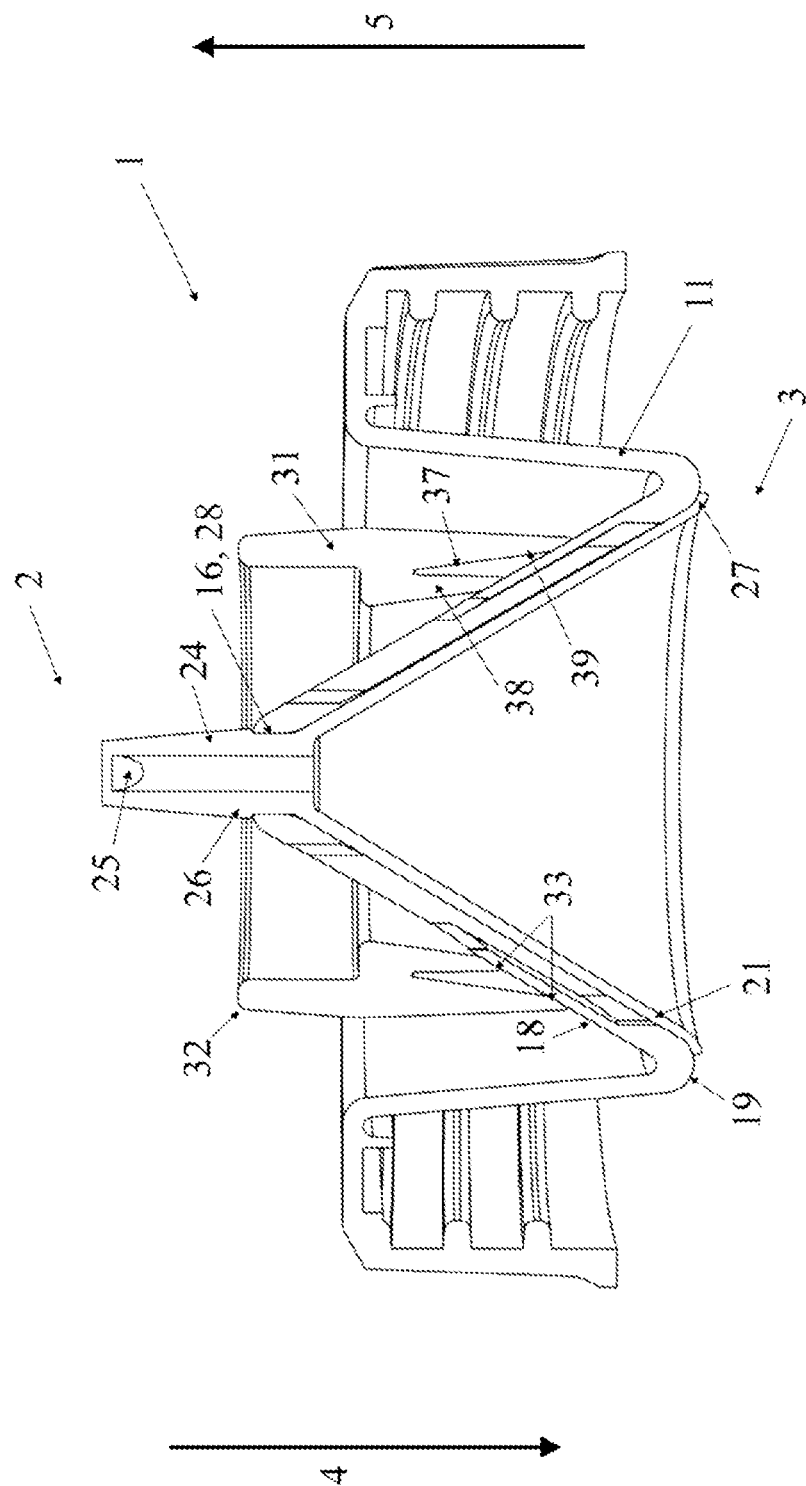

This application claims the priority of German patent application 10 2022 201 998.9, application date 25 Feb. 2022, and of German patent application 10 2022 202 198.3, application date 3 Mar. 2022.

The present invention relates to a check valve suitable for use in a portable or stationary toilet, for example as a stench trap, and to a toilet having the check valve. The check valve is characterized by being of simple construction and effectively preventing a backflow of liquid and the leakage of odors. The check valve is characterized by an integrated venting device, which is preferably low-noise and does not allow a flow of liquid in the blocking direction of the check valve.

Preferably, the check valve according to the invention is arranged so that liquid can flow from a toilet bowl through the check valve into a collection container, wherein the check valve seals the transition in a liquid-tight and preferably odor-tight manner.

It is known to use check valves with built-in plugs for a check protection of liquids. These have the disadvantage that a separate venting device must be installed, as otherwise a collecting container of constant volume downstream of the check valve builds up excess pressure, which makes further inflow of liquid difficult.

OBJECT OF THE INVENTION

The invention has the object to provide an alternative check valve with integrated venting, which allows liquid to be filled into a downstream container of constant volume and has an effective check action, and which preferably reduces the penetration of odors.

DESCRIPTION OF THE INVENTION

The invention achieves the object by the features of the claims and, in particular, provides a check valve and a toilet equipped therewith, which check valve between an inlet end and an opposite outlet end along a common longitudinal axis in succession, for example in this order, comprises or consists of optionally an adapter arranged between the inlet end and a seal seat,
a seal seat formed by a rigid scaffold,
a closure element formed by an elastic closure part,
optionally a stop with a closure piece, which stop can be latched to the scaffold, which closure piece is arranged between the stop and the closure part and is movable between them, wherein the scaffold and the closure part in the region of the seal seat are shaped to match one another, preferably formed to taper in the shape of a funnel in the direction toward the inlet end, and the closure part in a normal position of the check valve in the region of the seal seat is tensioned against the scaffold and rests against the scaffold and is held therein by its elasticity, wherein the scaffold in the region of the seal seat has breaches and the closure element is formed in one piece with a venting device. Generally, the closure element is arranged to flip away from the seal seat when pressure is applied in the passage direction, so that the check valve opens, and to abut the scaffold when pressure is applied in the blocking direction and in the normal or rest position, so that the check valve closes. The optional closure piece is arranged to abut the stop in an open position when pressure is applied in the passage direction, so that the check valve is permeable to fluid and air, and to abut the closure piece in a closed position when pressure is applied in the blocking direction, so that the check valve closes. In general, the scaffold and the closure part in the area of the seal seat can be shaped to match one another in a plane, e.g. as a plate, or tapered in a funnel shape, each with an at least triangular cross-section, e.g. a cross-section up to octagonal or up to hexagonal, preferably oval or circular cross-section.

In particular, the check valve is suitable for use in a separation toilet, especially for arrangement in the flow path provided for liquid excreta, which is formed by a separation insert. A separation toilet is understood to be a toilet which discharges liquid and solid excreta into separate containers, e.g. by means of a screen and/or separation insert with two flow paths adjacent to a larger opening, e.g. formed by a toilet bowl, which run separately from one another.

Generally, the check valve is contacted at its inlet end by, for example, a hose or a basin, preferably by a toilet bowl, and is contacted at its outlet end by, for example, a closed container, a flange or a hose, preferably by a collection container. Therein, the direction from the inlet end towards the outlet end is the passage direction and the opposite direction, i.e. from the outlet end towards the inlet end, is the blocking direction of the check valve. A normal position of the check valve is defined by the inlet end being located above the outlet end so that the gravity or weight forces act in the direction towards the outlet end. In an overhead position, the outlet end is located above the inlet end, causing the gravity or weight forces to act in the opposite direction, i.e., toward the inlet end. In the rest position of the check valve, essentially no forces or pressures of liquids or gases act on the check valve from the inlet end.

Generally, the optional adapter, the scaffold, the closure part, the optional closure piece, and the optional stop of the check valve all have a substantially circular cross-section or resp. are substantially rotationally symmetrical. This gives the check valve the advantage of being easy to assemble and tolerating slight variations in the alignment of the inlet and outlet ends without leaking.

The scaffold of the check valve is preferably formed in one piece and acts in an inner section of its cross-section as a seal seat of the check valve and optionally in an outer section of its cross-section as a closure towards e.g. a container or hose connected to the outlet end of the check valve. The scaffold is made of a deflection resistant or rigid material, e.g. hard plastic, e.g. polypropylene. The scaffold is arranged with a first side facing the inlet end and a second side facing the outlet end, the distance between the first and second sides along the surface normals also being referred to as the thickness of the scaffold.

In the inner section of its cross-section, the scaffold is shaped as a funnel which tapers towards the inlet end and forms the sealing surface of the check valve. In the center of its cross-section, the scaffold has an opening.

In the wall of its inner section or resp. in the sealing surface, the scaffold has breaches which are preferably arranged each with a first end in the direction toward the opening and with an opposite second end toward the direction of the outer section of the scaffold, e.g. of the funnel, the breaches preferably tapering each in the direction toward the opening and braces running in each of the intermediate spaces. For example, at least 3 breaches may be arranged in the scaffold, between which at least 3 braces run.

In the outer section of its cross-section, the scaffold is optionally shaped as a closure, e.g. as a union nut or cover, preferably with an internal screw thread. In this way, the check valve is set up to seal tightly in the direction toward the outlet end apart from the breaches in the sealing surface and the opening, so that no air or liquid can escape in the area of the outer section of the check valve from, for example, a container, e.g. from a urine tank.

Preferably, the scaffold has contact webs in the area of the breaches on the first side of the scaffold, which contact webs are set up to be contacted in a liquid-tight manner by the optional adapter or, for example, by a separation insert of a separation toilet. Therein, the contact webs extend in the area adjacent to the second end of the breaches and preferably only over a portion of the thickness of the scaffold, preferably not beyond the first side of the scaffold. A scaffold with contact webs has the advantage that it has a higher sealing effect relative to, for example, the optional adapter than a scaffold without contact webs. In addition, due to the contact webs not extending over the entire thickness of the scaffold as preferred, the surface area of the breaches on the second side of the scaffold advantageously increases, so that the check valve already opens at lower fluid pressure than a check valve with contact webs that extend over the entire thickness of the scaffold.

At its second side opposite the first or resp. in the direction toward the outlet end, the scaffold is contacted by a closure part which acts as a closure element or sealing element or valve flap in that it is formed in a funnel section to match, e.g. to match in a funnel-shaped manner to the scaffold, so that in the rest position it preferably contacts the scaffold in its inner section over the entire surface and is preferably tensioned against the scaffold, optionally is not loaded against the scaffold, e.g. is not additionally spring-loaded. The funnel opening of the closure part in a funnel section preferably has an opening angle which corresponds to the opening angle of the scaffold in its inner section, in particular an opening angle of at least 20°, preferably at least 30°, at least 40°, at least 50°, at least 60° or at least 70° up to 120°, preferably up to 110°, up to 100°, up to 90° or up to 80°, more preferably up to <90°.

The closure part is generally made of a softer material than the scaffold, resp. is elastic, e.g. made of rubber, silicone or thermoplastic polyurethane (TPU), and is configured to fold away from the scaffold when pressure is applied in the passage direction, so that the check valve opens and is thereby permeable in the passage direction, and when pressure is applied in the blocking direction or resp. in the rest position rests against the scaffold due to its elasticity, so that the check valve closes and is thereby impermeable in the blocking direction.

Generally, the closure element is formed as a single piece with a venting device. E.g., for this purpose, the closure part can have an opening in a section which is set up to relieve an excess pressure in the blocking direction of the check valve. The venting device can be, for example, an opening, optionally terminal, in particular a terminally arranged slit in the elastic material of the closure part.

In the preferred embodiment, the closure part with a venting section adjoining the funnel section sectionally projects through the opening of the scaffold at a first end and, in the direction toward the inlet end at a distance from the scaffold, has a passage which is e.g. terminally arranged and which is arranged to form an opening in the closure part. Therein, the venting section is preferably hollowed out over its entire length and, in particular, forms a conduit so that gas can flow from the outlet end through the venting section to the inlet end of the check valve when pressure is applied in the blocking direction of the check valve. Preferably, the blocking direction and passage direction of the passage is respectively reverse to the blocking direction and passage direction of the check valve. Therein, it is preferred that in its passage direction the passage is permeable to gas and impermeable to liquid.

Optionally, the passage is formed by a non-return closure, e.g. a lip. As a result, the passage preferably is impermeable to gas, in particular to odors, in the rest position.

A screen or a filter can be arranged between the funnel section and the venting section of the closure part, wherein preferably the transition between the funnel section and the venting section is open. This is because it has shown that even with the transition between the funnel section and the venting section being open, the check valve seals well in the blocking direction and no liquid penetrates through the passage of the closure part.

Optionally preferred, the closure part is set up to open or resp. flap away from the scaffold already at an applied pressure corresponding to a filling level of liquid at the inlet end of the check valve, at which filling level the venting section of the closure part sectionally protrudes above the filling level, so that when the check valve opens, the passage protrudes out of the liquid, or the passage is arranged above the liquid surface. As a result, the check valve has the advantage that pressure equalization through the passage takes place quietly, in particular without bubbling.

Preferably, the closure part contacts the scaffold only in the region of the opening and in a region at the second end of the closure part, which may e.g. be in the form of a beading.

Generally, the closure element is retained on the seal seat. Therein, it is preferred that the outer cross-section of the closure part in the area that projects through the scaffold is larger, at least sectionally, than the cross-section of the opening in the center of the scaffold, in particular that it has an undercut, which can be formed next to a circumferential bead, for example, and is thus held in a clamping manner by the scaffold. As a result, the closure element has the advantage that it can be held in the seal seat in an exclusively clamping manner and can be easily replaced, for example.

Optionally, the scaffold is contacted on its first side facing the inlet end of the check valve by an adapter, the outer cross-section of which is preferably cylindrical. The adapter is preferably elastic, in particular made of a softer material than the scaffold, e.g. silicone or TPU. The adapter has a first end and a second end lying opposite along the common longitudinal axis, wherein the adapter is arranged with its first end adjacent to the inlet end of the check valve and with the second end adjacent to the scaffold. The adapter seals between the inlet end and the seal seat, that is, on the side of the seal seat opposite the closure element.

In one embodiment, the first end of the adapter may be arranged adjacent to, for example, a separation insert of a separation toilet, or can sectionally enclose it, and the second end of the adapter may contact the first side of the scaffold. As a result, the adapter acts as a seal between the inlet end and the seal seat of the check valve. Therein, it is generally preferred that the adapter is not fixedly attached to the scaffold, but is merely pressed against the first side of the scaffold.

Starting from its first end, the adapter preferably has a first section having a larger inner cross-section and, adjacent thereto, a second section having a smaller inner cross-section, wherein a circumferential bearing surface is arranged between the first and second sections, which bearing surface preferably runs in parallel to the cross-section of the adapter or transversely or at right angles to the common longitudinal axis. Therein, the adapter is configured to enclose and to contact with its bearing surface and to thereby seal an inlet container, e.g. a toilet bowl or e.g. a separating insert.

Alternatively or additionally, the adapter may have a thread or a bayonet fitting formed on its inner side in its first. As a result, the adapter is set up to be screwed onto a hose or bowl connected to its first end, so that with respect to this a better sealing effect is achieved than using an adapter having a smooth inner side.

The adapter is generally configured so that its second end makes liquid-tight contact with the first side of the scaffold. Therein, the second end of the adapter preferably contacts the braces of the scaffold and optionally the contact webs.

In its second section, the adapter preferably has a circumferential groove that divides the adapter into an outer section and an inner section, the ends of which are movable relative to one another. Therein, the adapter is designed so that its second end in the inner section has a smaller spacing along the common longitudinal axis to the first end than in the outer section, so that it is adapted to the funnel-shaped wall of the scaffold and with its second end makes tight contact with the scaffold both in the inner section and in the outer section.

Optionally, the check valve additionally has a stop between the closure part and the outlet end, e.g. at a distance from the scaffold, which stop can generally be latched to the scaffold. A closure piece is arranged between the stop and the closure part, wherein in the normal position of the check valve the closure piece is arranged to allow venting through the venting device of the check valve and, for example, in the overhead position the closure piece is arranged to additionally close the access to the venting device, in particular the venting section and/or the venting device, so that no liquid can flow through e.g. the venting section towards the inlet end. In this regard, the stop is adapted to hold the closure piece. Therein, the stop generally in the center of its cross-section has an opening with a diameter, and the closure piece generally has a diameter that is larger than this opening and preferably larger or smaller than the diameter of the stop.

The stop is further set up to be latched to the scaffold and, in the normal position, to allow the fluid to flow through in the passage direction. To this end, the stop can be latched to the scaffold, for example, by having at least one projection, for example at least or exactly 3 projections, which can each be latched into and released from opposite and matching recesses in the wall of the scaffold, so that the stop can be fixed at a spacing from the scaffold about the common longitudinal axis. Alternatively, for example, the scaffold may have at least one projection extending preferably circumferentially around the entire circumference of the scaffold, and the stop may have at least one opposing matching recess, preferably circumferential. Therein, it is further preferred that the scaffold has a circumferential edge extending from the scaffold wall towards the outlet end of the check valve and preferably abutting the stop when the stop is fixed to the scaffold.

In a first embodiment, adjacent to the opening, the stop may extend in a funnel-shaped section converging toward the inlet end. In this embodiment, the stop may be planar in a circumferential outer section adjacent to the funnel-shaped section lying opposite to the opening and can preferably be arranged transverse to the common longitudinal axis. The opening angle of the funnel-shaped section of the stop is then preferably smaller than the opening angle in the funnel-shaped inner section of the scaffold, for example smaller by 10° to 50°. The stop is made of a deflection resistant material, e.g. hard plastic, in particular polypropylene. Optionally, in the wall of the stop, breaches are arranged which extend at a distance from the opening along the funnel-shaped section into the outer section of the stop and between which braces run. Preferably, in this first embodiment, the stop has at least 3 breaches between which at least 3 braces extend.

In this first embodiment with optional stop, a stop ball as a closure piece is preferably arranged along the longitudinal axis between the stop and the closure part. Therein, the ball diameter of the stop ball is generally larger than the diameter of the opening. Generally, the stop is spaced from the closure part in the area of its opening by a distance that is greater than the portion of the ball diameter that projects beyond the plane of the opening when the stop ball is arranged in the opening. Preferably, the stop is formed in the area around its opening sectionally transverse to the passage direction or to the blocking direction, so that in a circumferential region around the opening the spacing between the stop and the closure part is smaller than the ball diameter. The stop ball is thereby arranged to allow venting through the venting section of the closure part in the normal position of the check valve and, for example, to contact and thereby close the venting section in the overhead position so that no liquid can flow through the venting section in the direction of the inlet end and/or to the venting device. In a second embodiment, the stop may extend substantially transversely to the common longitudinal axis and not have a funnel-shaped region. Adjacent to the opening in the center of its cross-section, the stop may then have recesses that extend, preferably crenellated, i.e., with respective intermediate radial webs, radially to a circumferential outer edge of the stop. In this second embodiment, the closure piece may be formed, for example, as a spherical section or as a curved plate, preferably having a diameter which is larger than the opening in the center of the stop and which is smaller than the diameter of the stop, and further preferably having crenellated recesses at its circumferential outer edge. In this embodiment, the closure piece is arranged to allow venting through the venting section of the closure part when pressure is applied in the passage direction, and to contact and thereby close the closure part, for example in the region of its projection, when pressure is applied in the blocking direction, so that no fluid can flow through the venting section toward the inlet end.

Preferably, the adapter, scaffold and closure part are made of materials that are machine cleanable, e.g. machine washable, in particular at 65° C., without permanent deformation, and further preferably resistant to chlorine-containing cleaning agents.

Optionally, a tube is mounted in or at the venting section, in particular with its first end clamped in the venting section, the tube extending along the closure part, preferably also through and beyond the scaffold, and the tube having a kink in the region or beyond its region which lies in the plane of the terminal cross-sectional opening of the closure part opposite the venting section, and at its second end lying opposite to the first end, beyond the kink, has a passive element which can be a float or a weight of higher density than water. The tube, having its first end attached to the venting section, has a passive element arranged at its opposite second end and a kink therebetween, preferably located in the region of the plane of the terminal cross-sectional opening of the closure part or outside the closure part.

Therein, the terminal cross-sectional opening of the closure part lies opposite to the venting section and, in the case of a funnel-shaped closure part, is the larger terminal cross-sectional opening thereof. When the passive member is a float having a density lower than water, the passive member is moved by fluid and pivots the tube in the kink. If the passive element is a weight, the tube in the kink is moved when the tube is pivoted from the vertical and is kinked, for example, when the check valve is turned overhead. This tube may be clamped or latched to the inside or outside of the venting section, e.g., screwed on or locked with a bayonet catch. Alternatively, the tube may be formed as a single piece with the venting section, e.g. as an injection molded part.

In general, the adapter, scaffold and closure part as well as the optional tube at its venting section are detachably connected to each other, in particular not glued. Thereby, the check valve has the advantage of being detachable and easy to clean without the use of tools, and individual components being replaceable independently of one another.

Short description of the figures: The figures show in

Figure 2:
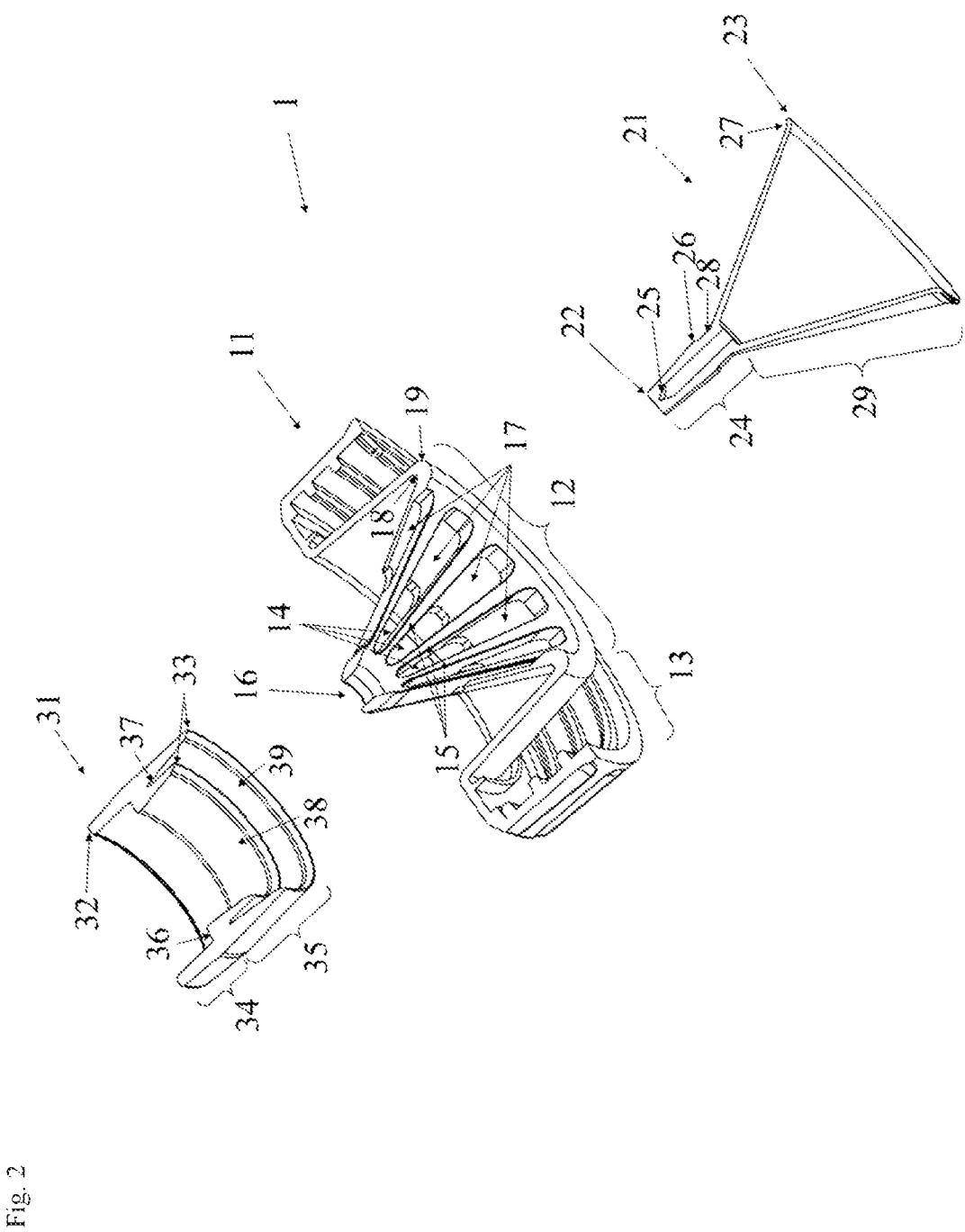
Figure 3:
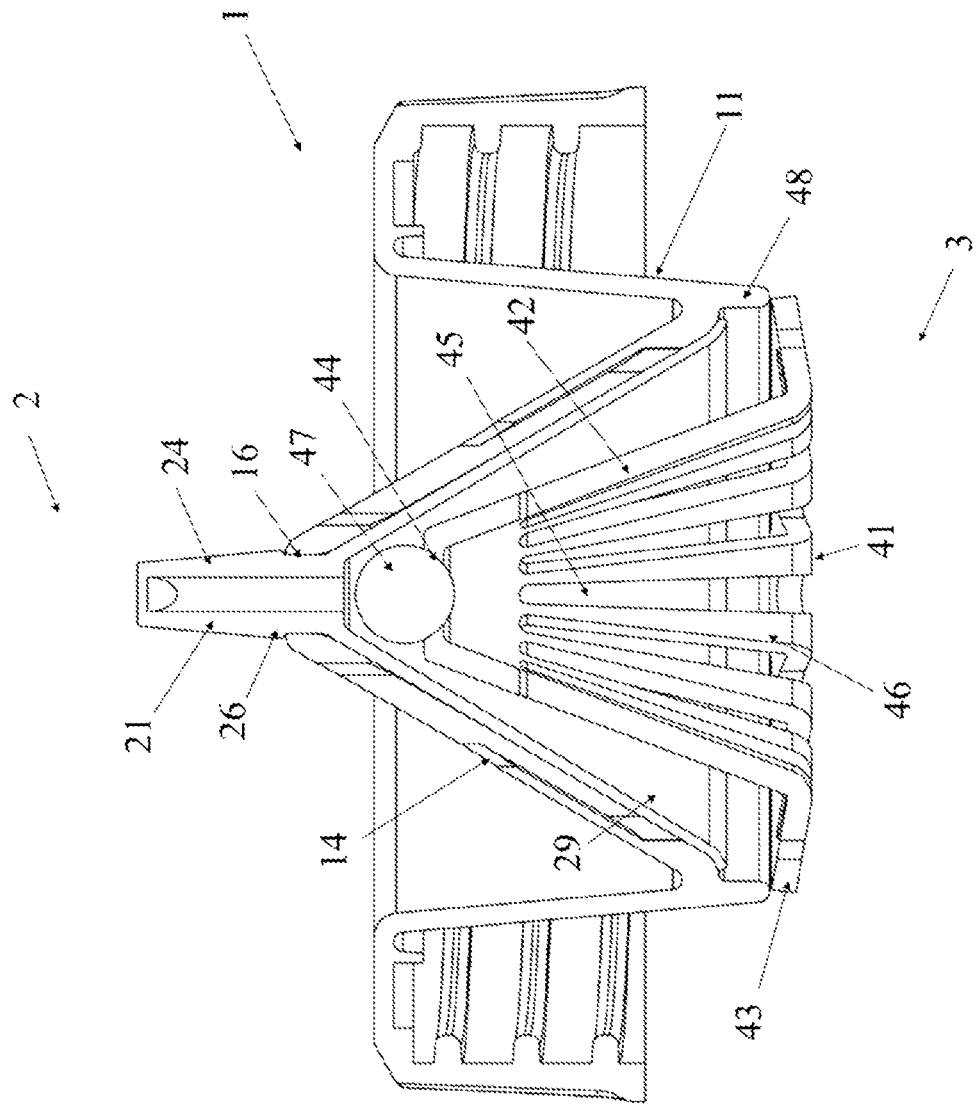
Figure 4:
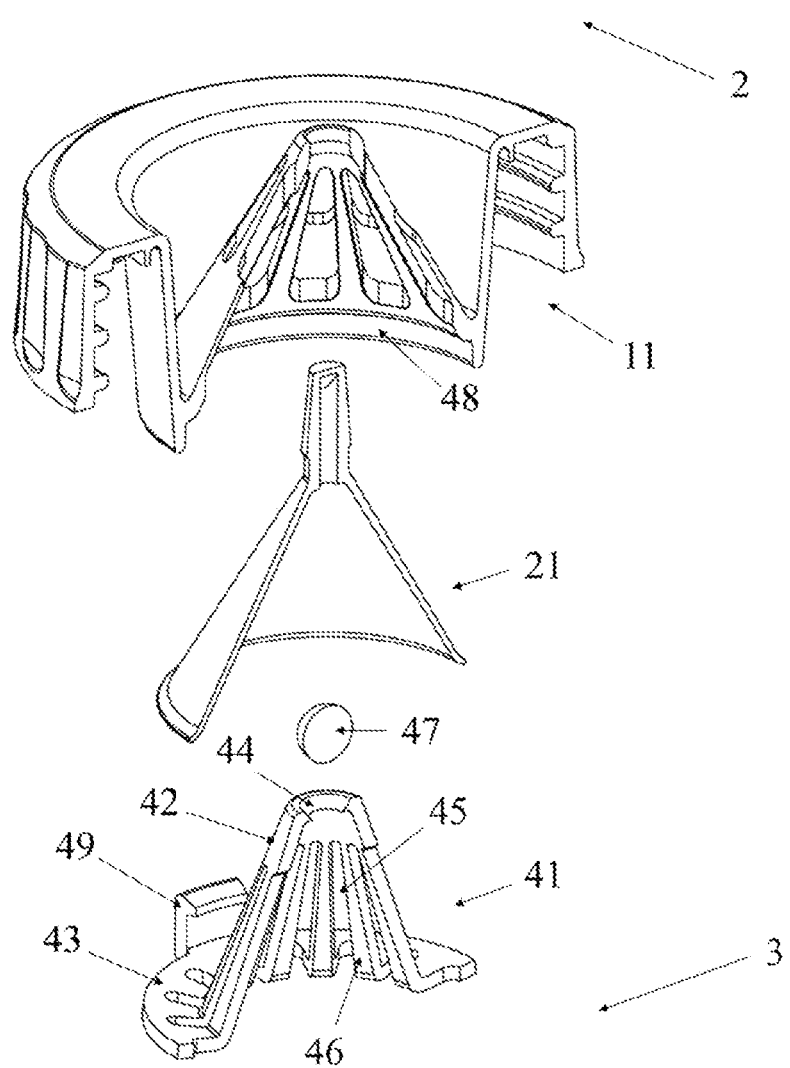
Figure 5:
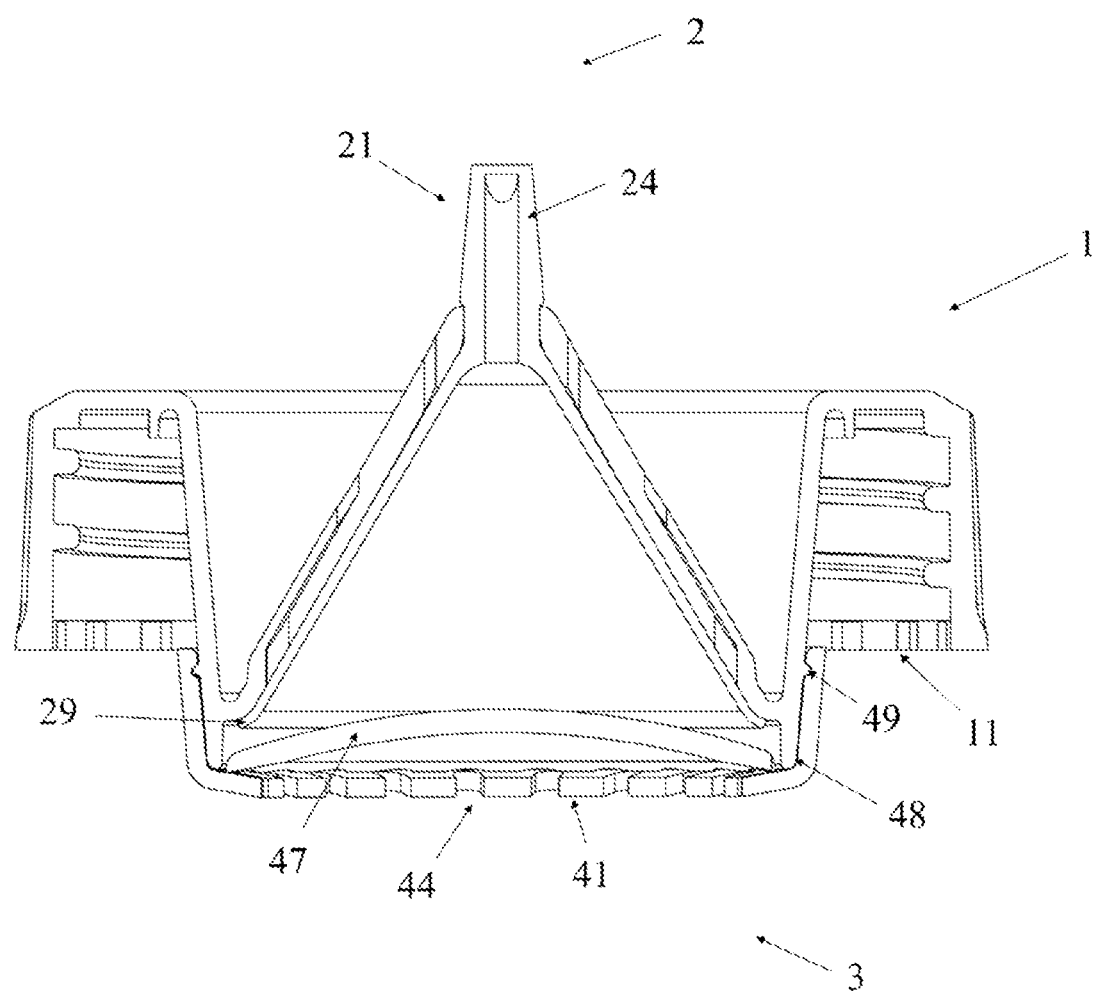
Figure 6:
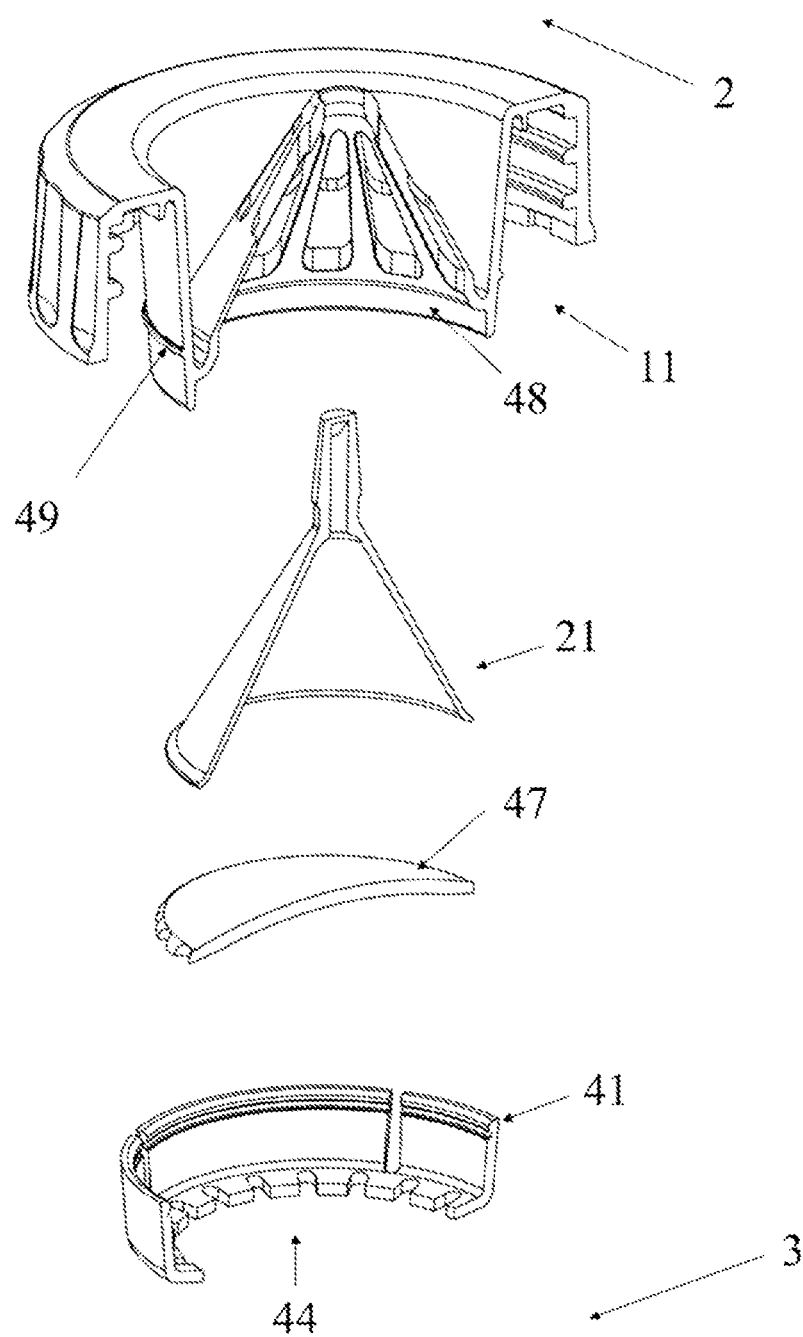
Figure 7:
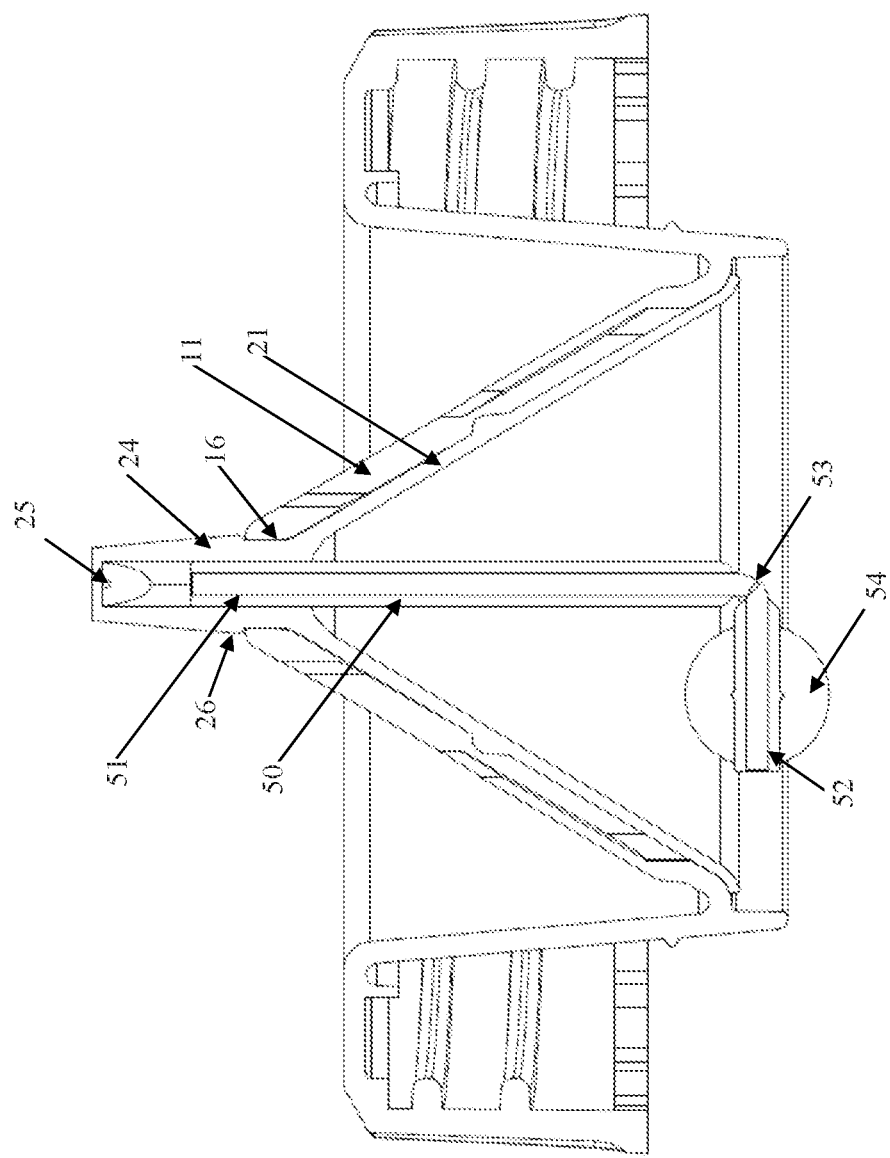

FIG. 1 a cross-sectional view of an embodiment of the check valve,

FIG. 2 a cross-sectional view of the embodiment shown in FIG. 1 in exploded view, FIG. 3 a cross-sectional view of another embodiment of the check valve, FIG. 4 a cross-sectional exploded view of the embodiment shown in FIG. 3, FIG. 5 a cross-sectional view of another embodiment of the check valve, FIG. 6 a cross-sectional view of the embodiment shown in FIG. 5 in exploded view and in FIG. 7 an embodiment of the check valve.

In the figures, identical reference numerals denote functionally identical elements.

FIG. 1 shows an embodiment of the check valve 1 with an inlet end 2 and an outlet end 3 lying opposite along the common longitudinal axis, wherein the direction from the inlet end 2 to the outlet end 3 is the passage direction 4 and the opposite direction is the blocking direction 5. In the passage direction 4, an adapter 31, a scaffold 11 and a closure part 21 are arranged successively along a common longitudinal axis, wherein, in the rest position of the check valve 1, the scaffold 11 is contacted on a first side 18 by the adapter 31 and is contacted on a second side 19 by the closure part 21.

In the center of its cross-section, the scaffold 11 arranged between the adapter 31 and the closure part 21 has an opening 16 through which a venting section 24 projects, which is integrally formed with the closure part 21. Therein, the closure part 21 forms the closure element and the venting section 24 forms the venting device of the check valve 1. The closure part 21 is held in the opening 16 in that it is arranged with a region of smallest outer cross-section 28 in the opening 16, and in that it has a bead 26 in the direction toward the inlet end 2, next to which an undercut is formed, the bead 26 having a larger outer cross-section than the cross-section of the opening 16. According to FIG. 1, the inner cross-section of the closure part 21 is substantially constant in the region of the venting section and tapers only in the direction towards the outlet end 2 in the region of the passage 25. At its opposite end facing the outlet end 3, the closure part 21 has a protrusion 27 with which it abuts against the scaffold 11 and seals the check valve 1 in the blocking direction.

The second section 35 of the adapter 31 sectionally is divided into an inner section 38 and an outer section 39 by means of a circumferential groove 37, wherein the spacing along the common longitudinal axis between a first end 32 and a second end 33 of the adapter 31 is greater in the outer section 39 than in the inner section 38. As a result, the adapter 31 is adapted to contact and seal the scaffold 11 with its second end 33 in both the inner section 38 and the outer section 39.

In FIG. 2, the components of the check valve 1 are shown in detail. The scaffold 11 is funnel- or cone-shaped in an inner section 12 and has breaches 14 that taper toward the central opening 16 and form braces 15 between them. Due to the braces 15, the inner section 12 is deflection resistant.

In its outer section 13, the scaffold is shaped as a screw cap with an internal thread.

In the area of its breaches 14, the scaffold has contact webs 17 which each extend only over a section of the cross-section of the breaches 14, namely only over part of the thickness, i.e. the distance between the first side 18 and the second side 19 of the scaffold. In the embodiment shown here, the contact webs extend from the plane of the first side 18 over about half the thickness of the scaffold 11. In the region of the second side 19 of the scaffold, the breaches 14 therefore have a larger cross-section than in the region of the first side 18. The transition between the smaller and larger cross-section of the breaches 14 can, as shown here, run in parallel to the first and second sides 18, 19, respectively, or can e.g. be beveled.

In a funnel section 29, the closure part 21 has a shape that matches the second side 19 of the scaffold 11 and, according to FIG. 2, terminates at the second end 23 of the closure part 21 with a protrusion 27. In the direction from the second end 23 towards the first end 22, the outer cross-section of the closure part 21 initially tapers conically to a region of smallest cross-section 28 and then widens to form a bead 26 whose outer cross-section is larger than the cross-section of the opening 16 and may e.g. thereafter taper again towards the first end 22. The inner cross-section of the closure part 21 tapers from the second end 23 to the first end 22, initially in a funnel shape in the region of the funnel section 29, and then extends in the region of the venting section 24 with a substantially constant inner cross-section, as shown here as an option, before the inner cross-section tapers to the passage 25.

The funnel section 29 is integrally formed with the venting section 24, so that the closure part 21 at the same time acts as a venting device.

The adapter 31 is divided, starting from its first end 32 toward its second end 33, into a first section 34 and a second section 35. The second section 35 has a smaller inner cross-section than the first section 34, the outer cross-section of the adapter being substantially constant. A bearing surface 36 is disposed between the first and second sections 34, 35 and runs in parallel to the cross-sectional plane of the adapter 31. In its second section 35, the adapter 31 is divided by a circumferential groove 37 into an inner section 38 and an outer section 39, which form an inner and outer ring, respectively, at the second end 33 of the adapter. As preferred, the adapter 31 is configured to contact and seal the scaffold 11 with both the inner ring and the outer ring in the region of the contact webs 17.

In the rest position of the check valve 1, the adapter 31 rests with its second end 33 against the first side 18 of the scaffold 11, and the closure piece 21 rests against the second side 19 of the scaffold 11 at least in the region of the protrusion 27, the venting section 24 projecting at least sectionally through the opening 16 of the scaffold 11. When a fluid is applied to the inlet end 2 of the check valve 1, the weight of the fluid exerts a pressure on the funnel section 29 of the closure part 21 in a direction away from the scaffold 11. As a result, the funnel section 29 flips away from the scaffold 11 and allows the liquid to flow through the breaches 14 in the passage direction 4. Slippage of the closure part 21 out of the opening 16 of the scaffold 11 is prevented by the bead 26. When an overpressure is built up in a downstream container by the inflowing liquid, air simultaneously flows through the venting section 24 and the passage 25 in the opposite direction, which is the blocking direction 5 of the check valve 1. After the liquid flows through, the funnel section 27 flips back toward the scaffold 11 and contacts it.

If the check valve 1 or a toilet containing the check valve 1 is rotated, e.g. into an overhead position, the liquid in the downstream container exerts a pressure on the closure part 21 in the blocking direction 5 by virtue of its weight. As a result, the closure part 21 is pressed against the scaffold 11 in the region of its funnel section 29 and seals off its inner section 12 so that no liquid can pass through. No liquid can escape through the passage 25 either, as this is impermeable to liquids. In the outer section 13, the scaffold closes the container by means of a screw cap so that no liquid can escape here either.

In the embodiment of the check valve 1 shown in FIGS. 3 and 4, a scaffold 11, a closure part 21, a stop ball as a closure piece 47, and a stop 41 are arranged adjacent to each other along a common longitudinal axis between the inlet end 2 and the outlet end 3.

The stop 41 has a ball seat as an opening 44 in the center of its cross-section and several breaches 45 in its funnel-shaped section 42, which form braces 46 between them. The braces 46 make the funnel-shaped section 42 deflection resistant. The breaches 45 extend into the outer section 43 of the stop 41, which is formed transversely to the common longitudinal axis, so that in the position in which the closure part 21 is folded away from the scaffold 11 and rests against the stop 41, the breaches 45 are still partially accessible and fluid can flow through them. A stop ball is arranged in the opening 44 as a closure piece 47, which stop ball is spaced from the closure part 21 in the normal or rest position of the check valve 1 shown here. The scaffold 11 has a circumferential edge 48 which extends in the direction toward the outlet end 3.

As shown in FIG. 3, the stop 41 in its funnel-shaped section 42 has a smaller opening angle than the opening angle in the inner section 12 of the scaffold 11.

FIG. 4 shows a projection 49 by means of which the stop 41 can be latched to the scaffold 11. Therein, the projection 49 engages in opposite matching recesses in the wall of the scaffold 11. In FIG. 3, the stop 41 is fixed to the scaffold 11 so that the edge 48 contacts the stop 41.

When a liquid is applied to the inlet end 2 of the check valve 1, the weight of the liquid exerts a pressure on the funnel section 29 of the closure part 21 in a direction away from the scaffold 11. As a result, the funnel section 29 flips away from the scaffold 11 to the stop 41 and allows the fluid to flow through the breaches 14, 45 toward the outlet end 3. Slippage of the closure part 21 out of the opening 16 of the scaffold 11 is prevented by the undercut formed adjacent the bead 26 with which the closure part rests on the scaffold 11. However, even if the closure part 21 were to slip partially out of the scaffold 11, it would only slip out until it meets the stop ball as the closure part 47, with the vent portion 24 continuing to protrude through the opening 16.

If an overpressure is built up in a downstream container by the inflowing liquid, air flows through the venting section 24 in the opposite direction. After the liquid has flowed through, the funnel section 29 flips back toward the scaffold 11 and contacts it.

When the check valve 1 is rotated into an overhead position, the closure piece 47, which is formed as a stop ball, is moved by its gravity out of the opening 44 toward the closure part 21 and closes its venting section 24 so that no fluid can pass through it toward the inlet end 2.

In the embodiment of the check valve 1 shown in FIGS. 5 and 6, a scaffold 11, a closure part 21, a closure piece 47, and a stop 41 are arranged in sequence along a common longitudinal axis between the inlet end 2 and the outlet end 3.

The stop 41 has an opening 44 in the center of its cross-section and recesses adjacent thereto, each extending crenellated radially in the wall of the stop 41. The stop 41 is formed in an outer region 43 in parallel to the common longitudinal axis and has a circumferential recess in which a circumferential projection 49 formed in the edge 48 of the scaffold 11 engages. In FIG. 5, the stop 41 is latched to the scaffold 11, wherein the edge 48 contacts the stop 41.

The closure piece 47 is formed as a curved plate, the diameter of which is larger than the diameter of the opening 44, but smaller than the diameter of the stop 41. In the circumferential outer edge of the closure piece 47, recesses are arranged in a crenellated manner, so that in the normal position of the check valve 1, fluid can flow through the crenellated recesses in the closure piece 47 and stop 41 towards the outlet end 3. The closure part 21 folded away from the scaffold 11 may contact the closure piece 47, or may be spaced from the closure piece by its protrusion 29.

When the check valve 1 is rotated to an overhead position, the closure piece 47, which is designed as a ball section, is moved by its gravitational force towards the closure part 21 and contacts the latter, e.g. in the area of the protrusion 29, so that the venting section 24 is closed so that no liquid can flow through it toward the inlet end 2.

FIG. 7 shows a tube 50 extending through the closure part 21 and the scaffold 11. The first end 51 of the tube 50 is fixed in the venting section 24 by clamping, and its opposite second end 52 extends beyond the closure part 21 in the unloaded condition. The tube 50 has a kink 53, which is preferably located in the region of the plane of the terminal cross-sectional opening 210 of the closure part 21 or outside the closure part 21. A passive element 54 is attached to the second end 52 of the tube 50, which passive element 54, in the embodiment as a float, floats when loaded by liquid and pivots the second end 52 of the tube 50 about the kink 53 and reduces, preferably closes, the inner cross-section thereof. The tube 50 with the float as passive element 54 therefore acts in the kink 53 as a closure piece for the venting section 24 as the liquid level rises below the closure part 21.

Alternatively, the passive element 54 may be a weight of higher density than water, so that a pivoting of the tube 50 from the vertical, such as when the check valve is tilted, reduces the inner cross-section in the kink 53.

| | Reference numerals: |
|---|---|
| 1 | check valve |
| 2 | inlet end |
| 3 | outlet end |
| 4 | passage direction |
| 5 | blocking direction |

-continued

| Reference numerals: | |
|---|---|
| 11 | scaffold |
| 12 | inner section |
| 13 | outer section |
| 14 | breach |
| 15 | brace |
| 16 | opening |
| 17 | contact web |
| 18 | first side |
| 19 | second side |
| 21 | closure part |
| 21o | terminal cross-sectional opening |
| 22 | first end |
| 23 | second end |
| 24 | venting section |
| 25 | passage |
| 26 | bead |
| 27 | protrusion |
| 28 | region of smallest outer cross-section |
| 29 | funnel section |
| 31 | adapter |
| 32 | first end |
| 33 | second end |
| 34 | first section |
| 35 | second section |
| 36 | bearing surface |
| 37 | groove |
| 38 | inner section |
| 39 | outer section |
| 41 | stop |
| 42 | funnel-shaped section |
| 43 | outer section |
| 44 | opening |
| 45 | breach |
| 46 | brace |
| 47 | closure piece |
| 48 | edge |
| 49 | projection |
| 50 | tube |
| 51 | first end of the tube |
| 52 | second end of the tube |
| 53 | kink |
| 54 | passive element |

The invention claimed is:

1. A check valve comprising:
an inlet;
an outlet;
a rigid scaffold comprising breaches; and
an elastic closure part along a common longitudinal axis with the rigid scaffold between the inlet and the outlet, wherein the scaffold is between the closure part and the inlet, wherein the closure part sectionally projects with a venting section through an opening of the scaffold and comprises a passage in a direction toward the inlet, the passage being spaced from the scaffold,
wherein the scaffold and the closure part are shaped to match one another, wherein the inlet and the closure part taper in a funnel shape toward the inlet, and wherein the closure part is tensioned against the scaffold and held therein when the closure part is in a rest position.

2. The check valve according to claim 1, wherein the closure part is clamped to the scaffold by an undercut formed next to a bead in the opening of the scaffold.

3. The check valve according to claim 1, wherein the passage comprises a non-return closure.

4. The check valve according to claim 1, wherein the venting section of the closure part sectionally projects beyond a filling level of the check valve.

5. The check valve according to claim 1, comprising an elastic adapter having a first end and a second end along the common longitudinal axis, wherein first end is adjacent to the inlet and the second end is adjacent to the scaffold.

6. The check valve according to claim 5, wherein the adapter comprises a first section, an adjacent second section, and a circumferential bearing surface between the first section and the second sections, wherein the circumferential bearing surface extends transversely to the common longitudinal axis and the first section comprise a larger inner cross-section than an inner cross-section of the second section.

7. The check valve according to claim 6, wherein the adapter comprises a circumferential groove that divides the adapter into an inner section and an outer section, wherein the inner section and outer section comprise ends the are movable relative to each other.

8. The check valve according to claim 1, wherein the scaffold comprises contact webs on a first side, wherein the contact webs extend over a portion of the thickness of the scaffold.

9. The check valve according to claim 5, wherein the scaffold comprises a stop and a closure piece, wherein the closure piece is movable and is arranged between the stop and the closure part.

10. The check valve according to claim 9,
wherein the stop comprises a center opening; and
wherein the closure piece comprises a diameter larger than the center opening and smaller than a diameter of the stop.

11. The check valve according to claim 10, consisting of the adapter, the scaffold, the closure part, the closure piece, and the stop.

12. The check valve according to claim 1, comprising a tube connected with a first tube end to the venting section, the tube extending through the closure part with and comprising a second tube end with a passive element, the tube comprising a kink the first tube end and the passive element.

13. The check valve according to claim 12, wherein the kink is located in a plane of a terminal cross-sectional opening of the closure part, wherein the terminal cross-sectional opening is opposite the venting section.

14. The check valve according to claim 12, wherein the passive element comprises a float or a weight with a density higher than water.

15. A separation toilet comprising a check valve according to claim 1.

16. The check valve according to claim 9, wherein the closure comprises an internally formed screw thread.

* * * * *